(12) United States Patent
You (10) Patent No.: US 12,518,728 B2
(45) Date of Patent: Jan. 6, 2026

(54) MOBILITY SOUND GENERATION APPARATUS AND METHOD THEREOF

(71) Applicants: Hyundai Motor Company, Seoul (KR); Kia Corporation, Seoul (KR)

(72) Inventor: Kyung Jin You, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 845 days.

(21) Appl. No.: 17/506,496

(22) Filed: Oct. 20, 2021

(65) Prior Publication Data
US 2022/0366882 A1     Nov. 17, 2022

(30) Foreign Application Priority Data

May 13, 2021  (KR) .......................  10-2021-0062111

(51) Int. Cl.
*G10H 1/00* (2006.01)
*G06V 20/00* (2022.01)
*G10H 1/46* (2006.01)

(52) U.S. Cl.
CPC ........... *G10H 1/0025* (2013.01); *G06V 20/00* (2022.01); *G10H 1/46* (2013.01); *G10H 2210/021* (2013.01); *G10H 2210/361* (2013.01); *G10H 2210/391* (2013.01)

(58) Field of Classification Search
CPC .. G10H 1/0025; G10H 1/46; G10H 2210/021; G10H 2210/361; G10H 2210/391; G06V 20/00
See application file for complete search history.

(56) References Cited

U.S. PATENT DOCUMENTS

2022/0108675 A1* 4/2022 Brockwell .............. G06F 3/165

FOREIGN PATENT DOCUMENTS

KR  10-2019-0137727 A   12/2019
WO  WO-2009139022 A1 * 11/2009 ............. G10H 1/366

* cited by examiner

*Primary Examiner* — Jianchun Qin
(74) *Attorney, Agent, or Firm* — Morgan Lewis & Bockius LLP (57) ABSTRACT

A mobility sound generation apparatus of generating a sound suitable for a landscape while driving of a mobility may include an information acquisition device provided in a mobility to acquire information on an outside landscape of the mobility while driving of the mobility; a sound generation device configured to generate a sound corresponding to the information on the outside landscape; and a sound output device configured to output the generated sound, whereby it is possible to acquire information on an outside landscape while driving of the mobility and generate a sound corresponding to the information on the outside landscape and it is possible for facilitating an occupant to admire a landscape by expressing the outside landscape with sound while driving to generate and provide the sound corresponding to water, mountains, buildings or the like forming the outside landscape of the mobility.

15 Claims, 7 Drawing Sheets

MOBILITY SOUND GENERATION APPARATUS AND METHOD THEREOF

CROSS-REFERENCE TO RELATED APPLICATION

The present application claims priority to Korean Patent Application No. 10-2021-0062111, filed on May 13, 2021, the entire contents of which is incorporated herein for all purposes by this reference.

BACKGROUND OF THE INVENTION

Field of the Invention

The present invention relates to a mobility sound generation apparatus and a method thereof, and more particularly, to a mobility sound generation apparatus that generates a sound suitable for landscape while driving and a method thereof.

Description of Related Art

A driver of a mobility can enjoy landscape as the outside landscape changes frequently while driving. However, other occupants who are sleeping in the mobility or the visually impaired cannot feel the outside landscape while driving the mobility. Furthermore, occupants who are in positions where the window of the mobility cannot be seen also cannot admire the outside landscape, and even if the window is visible, the outside landscape is partially blocked, so that occupants cannot fully appreciate the outside landscape.

Furthermore, as elements forming a sound, there may be an equalizer, a sound volume, a beat, and the like. By utilizing these elements, the demand for technology for generating and expressing an outside landscape of a mobility with sound is emerging.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a mobility sound generation apparatus of generating a sound suitable for a landscape while driving and a method thereof.

Various aspects of the present invention provide a mobility sound generation apparatus of generating a sound expressing weather while driving of a mobility to enable an occupant of the mobility to recognize weather outside the mobility and a method thereof.

Various aspects of the present invention provide a mobility sound generation apparatus of generating and providing a sound corresponding to water, mountains, buildings, or the like forming a landscape outside the mobility, expressing the outside landscape with the sound while driving to generate a driving environment for facilitating an occupant to enjoy the outside landscape and a method thereof.

Various aspects of the present invention provide a mobility sound generation apparatus of dynamically expressing an external environment with sound by providing different sound beats according to mobility, bike, person, or the like existing in the vicinity of the mobility while driving and a method thereof.

Various aspects of the present invention provide a mobility sound generation apparatus of generating tension while driving by expressing a degree of congestion around mobility with sound and a method thereof.

The technical problems of the present invention are not limited to the aforementioned problems, and any other technical problems not mentioned herein will be clearly understood from the following description by those skilled in the art.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a mobility sound generation apparatus includes an information acquisition device which is provided in a mobility to acquire information on an outside landscape while driving of the mobility, a sound generation device that generates a sound corresponding to the information on the outside landscape, and a sound output device that outputs the generated sound.

The information acquisition device may acquire the information on the outside landscape though a navigation map of the mobility and at least a camera provided in the mobility.

The sound generation device may set a background sound based on a ratio of a preset first category item occupying the outside landscape.

The preset first category item may include at least one of mobility, buildings, water, persons and mountains.

The sound generation device may determine a ratio of sound volumes for frequency bands based on a weather.

The sound generation device may generate an image corresponding to the weather, and determine the ratio of sound volumes for frequency bands corresponding to the image.

The information acquisition device may acquire an external image through a camera provided in the mobility, and the sound generation device may detect an image information corresponding to a preset second category item in the external image, and generate a beat according to the detected preset second category item.

The sound generation device may determine a speed of the beat according to a type of the detected preset second category item.

The sound generation device may determine a sound volume of the beat according to a density of the detected preset second category item.

The preset second category item may include at least a vehicle, a heterogeneous mobility, and a person.

The sound generation device may set a background sound based on a background sound used in a previous driving when it is determined based on navigation information of the mobility that a path through which the mobility is to drive includes a path through which the mobility has driven previously.

According to various aspects of the present invention, a mobility sound generation method includes acquiring, by an information acquisition device provided in a mobility, information on an outside landscape while driving of the mobility, and generating, by the sound generation device, a sound corresponding to the information on the outside landscape.

The generating, by the sound generation device, of the sound corresponding to the information on the outside landscape may include setting, by the sound generation device, a background sound based on a ratio of a preset first category item occupying the outside landscape.

The generating, by the sound generation device, of the sound corresponding to the information on the outside landscape may include determining, by the sound generation device, a ratio of sound volumes for frequency bands based on a weather.

The determining, by the sound generation device, of the ratio of sound volumes for frequency bands based on the weather may include generating, by the sound generation device, an image corresponding to the weather, and determining, by the sound generation device, the ratio of sound volumes for frequency bands corresponding to the image.

The acquiring, by the information acquisition device, of the information on the outside landscape during the driving of the mobility may include acquiring, by the information acquisition device, an external image through a camera provided in the mobility.

The generating, by the sound generation device, of the sound corresponding to the information on the outside landscape may include detecting, by the sound generation device, an image information corresponding to a preset second category item in the external image; and generating, by the sound generation device, a beat according to the detected preset second category item.

The generating of the beat based on the detected preset second category item may include at least one of generating, by the sound generation device, a speed of the beat according to a type of the detected preset second category item, and determining, by the sound generation device, a sound volume of the beat according to a density of the detected preset second category item.

The generating, by the sound generation device, of the sound corresponding to the information on the outside landscape may include setting, by the sound generation device, a background sound based on the background sound used in a previous driving when it is determined based on navigation information of the mobility that a path through which the mobility is to drive includes a path through which the mobility has driven previously.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 7.

Figure 1:
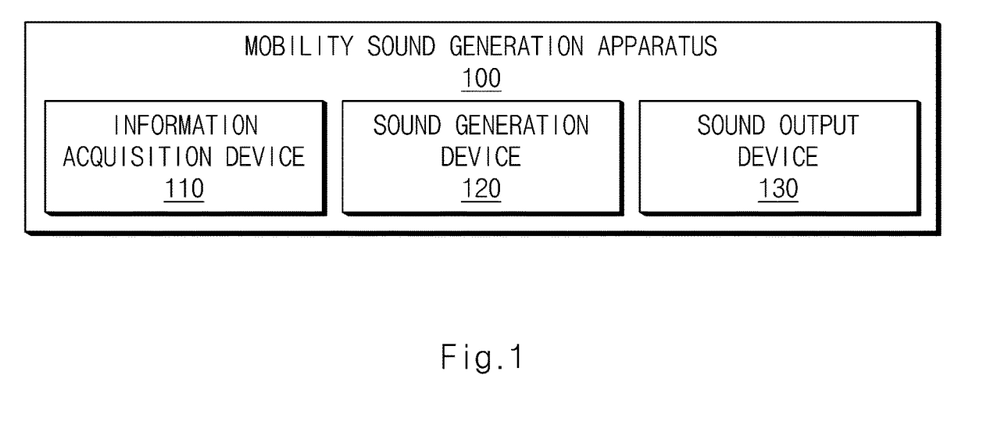
FIG. 1 is a block diagram illustrating an apparatus of generating a sound for mobility according to various exemplary embodiments of the present invention.

FIG. 1 is a block diagram illustrating a mobility sound generation apparatus according to various exemplary embodiments of the present invention.

Referring to FIG. 1, a mobility sound generation apparatus 100 may include an information acquisition device 110, a sound generation device 120, and a sound output device 130.

The mobility described in various exemplary embodiments of the present invention may refer to a transport means including a vehicle.

The mobility sound generation apparatus 100 according to various exemplary embodiments of the present invention may be implemented inside or outside the mobility. In the present case, the mobility sound generation apparatus 100 may be integrally formed with the internal control units of the mobility, or may be implemented as a separate hardware device and connected to the control units of the mobility through connection means.

As an example, the mobility sound generation apparatus 100 may be implemented integrally with a mobility, may be implemented to be installed/attached to a mobility as a configuration separate from the mobility, or some components thereof may be implemented integrally with mobility and the other components may be implemented to be installed/attached to the mobility as a configuration separate from the mobility.

The information acquisition device 110 may be provided in the mobility to acquire information on an outside landscape while driving of the mobility.

For example, the information acquisition device 110 may acquire information on the landscape through a navigation map of the mobility and a camera provided in the mobility.

As an example, the information acquisition device 110 may identify items included in a landscape of an area, in which the mobility is driving, through the navigation map of the mobility.

For example, the information acquisition device 110 may acquire information on whether water, mountains, buildings, or the like exist in an area in which the mobility is driving through the navigation map of the mobility.

The information acquisition device 110 may acquire information on whether water, mountains, buildings, or the like exist in an area in which the mobility is driving or how much water, mountains, buildings, or the like occupy the landscape visible from the mobility, if existing, through the navigation map of the mobility.

Furthermore, the information acquisition device 110 may acquire information on whether there is a previous driving history for a path on which the mobility is driving through the navigation map of the mobility.

For example, the information acquisition device 110 may acquire an external image through a camera provided in the mobility.

For example, the information acquisition device 110 may determine which classification items are included in the external landscape of the mobility through the external image acquired through the camera provided in the mobility.

As an example, the classification items may include a first category item and a second category item.

The preset first category item may include items corresponding to mountains, water, buildings, and the like forming the background of the landscape.

As an example, the first category items may include items that change when moving to another area after driving for a relatively long time, not items of small units such as mobility and people that change in real time in the external landscape according to the driving of mobility.

The second category item may include items corresponding to external vehicles, heterogeneous mobility, persons, or the like that change in real time in the external landscape.

As an example, the second category item may include items of small units such as mobility and persons that change in a relatively short time unit in the external landscape according to the driving of the mobility.

As an example, the information acquisition device 110 may be directly or indirectly connected to the sound generation device 120 through wireless or wired communication to transmit the acquired information on the outside landscape while driving of the mobility to the sound generation device 120.

The sound generation device 120 may generate a sound corresponding to the information on the landscape.

For example, the sound generation device 120 may generate a sound including a background sound corresponding to the information on the landscape, a beat, and an equalizer.

For example, the sound generation device 120 may set the background sound based on the ratio of the preset first category items occupying the landscape.

As an example, the preset first category item may include items including at least one of mobility, buildings, water, persons, and mountains.

For example, the sound generation device 120 may acquire information on the ratio of first category items occupying a background forming the landscape of an area through the characteristics of the area in which the mobility is driving through the navigation map.

Here, the ratio of the first category items occupying the background forming the landscape may be obtained as a ratio that allows a specific level of error and not as an accurate ratio.

As various exemplary embodiments of the present invention, the sound generation device 120 may acquire information on a ratio of first category items occupying a background forming a landscape based on an image acquired through a camera provided in the mobility.

For example, the sound generation device 120 may determine the ratio of a sound volume for each frequency band based on a weather.

As an example, the sound generation device 120 may acquire weather information through Audio, Video, Navigation (AVN) of the mobility or by receiving the weather information from an outside server.

As an example, the sound generation device 120 may generate an image corresponding to weather and determine a ratio of a sound volume for each frequency band corresponding to the image.

For example, the sound generation device 120 may classify the weather into items including at least one of sunny, cloudy, rain, snow, and slightly cloudy.

A process of generating an image corresponding to the weather and determining the ratio of a sound volume for each frequency band corresponding to the image in the sound generation device 120 will be described in detail later with reference to FIG. 4.

As an example, the sound generation device 120 may detect an image portion corresponding to a preset second category item from an external image, and generate a beat according to the detected preset second category item.

For example, the sound generation device 120 may analyze an external image of the mobility, acquired through the camera, to detect a preset second category item.

As an example, the sound generation device 120 may analyze the external image of the mobility, acquired through the camera, to determine the types and number of preset second category items.

As an example, the preset second category items may include items including at least a vehicle, a heterogeneous mobility, and a person.

Here, the heterogeneous mobility may include other types of mobility, such as a two-wheeled vehicle and personal mobility, rather than a vehicle.

For example, the sound generation device 120 may determine a beat speed based on the detected type of the preset second category item.

As an example, the sound generation device 120 may determine a sound volume of a beat based on the density of detected preset second category items.

A process of determining a speed of a beat based on the detected type of the preset second category item and determining the sound volume of the beat based on the density of the detected preset second category item in the sound generation device 120 will be described in detail below with reference to FIG. 5.

For example, when it is determined based on navigation information of the mobility that a path along which the mobility is to drive includes a path along which the mobility has driven previously, the sound generation device 120 may set a background sound based on the background sound used in the previous driving.

As an example, the sound generation device 120 may determine whether a path along which the mobility is to drive includes a path along which the mobility has driven based on the navigation information of the mobility, and when the path along which the mobility is to drive includes the path along which the mobility has driven, set a background sound to the background sound generated in the path along which the mobility has driven.

The sound generation device 120 may be directly or indirectly connected to the sound output device 130 through wireless or wired communication to transmit information on the generated sound to the sound output device 130.

The sound output device 130 may output the generated sound.

For example, the sound output device 130 may include a mobility audio speaker or an AVN speaker, and may output the generated sound through the mobility audio speaker or the AVN speaker.

By outputting a sound corresponding to a landscape through the sound output device 130, even visually-impaired persons may identify the outside landscape or traffic situation when a mobility is currently driving, achieving driving pleasure.

Figure 2:
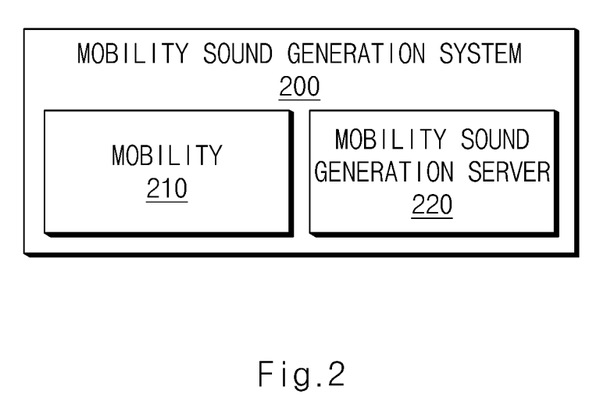
FIG. 2 is a block diagram illustrating a mobility sound generation system according to various exemplary embodiments of the present invention.

FIG. 2 is a block diagram illustrating a mobility sound generation system according to various exemplary embodiments of the present invention.

Referring to FIG. 2, a mobility sound generation system 200 may include a mobility 210 and a mobility sound generation server 220.

The mobility 210 may include an information acquisition device that acquires information on an outside landscape while driving of the mobility and a sound output device that outputs a sound.

For example, the information acquisition device and the sound output device included in the mobility 210 are the same as the information acquisition device 110 and the sound output device 130 of FIG. 1, respectively, and a detailed description thereof will be omitted.

However, in the mobility sound generation system 200 of FIG. 2, the function of the sound generation device 120 of FIG. 1, which generates a sound for the mobility may be performed by the mobility sound generation server 220.

For example, the information acquisition device may transmit the acquired information on the outside landscape while driving, to the mobility sound generation server 220 through a communication circuit provided in the mobility.

The mobility sound generation server 220 may generate a sound corresponding to the information on the landscape obtained from the information acquisition device.

The process of generating a sound corresponding to the information on the landscape in the mobility sound generation server 220 is the same as the process of generating a sound corresponding to the information on the landscape in the sound generation device 120 in FIG. 1 and thus a description thereof will be omitted.

For example, the mobility sound generation server 220 may transmit information on the sound generated to the mobility 210 through a communication circuit provided in the server.

Figure 3:
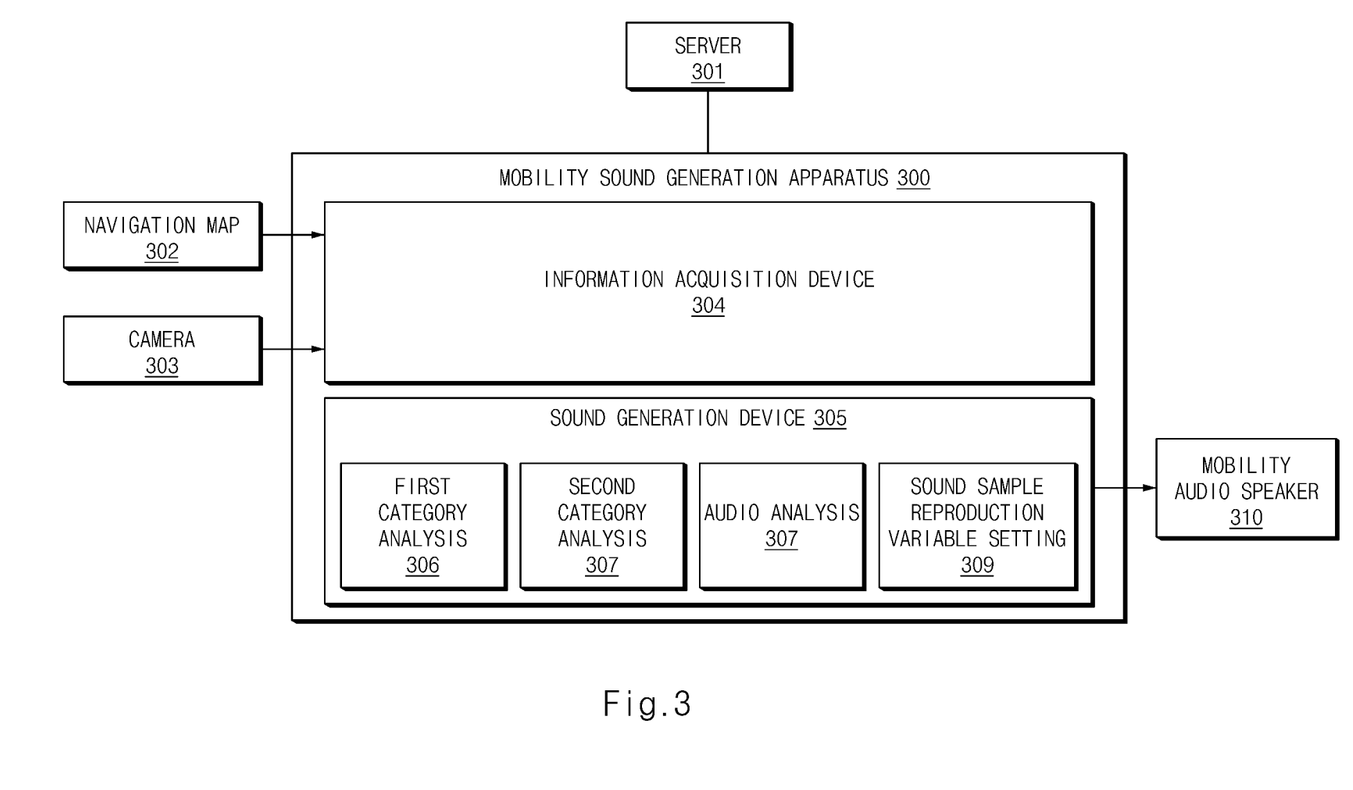
FIG. 3 is a diagram illustrating operations of components of a mobility sound generation apparatus according to various exemplary embodiments of the present invention.

FIG. 3 is a diagram illustrating operations of components of a mobility sound generation apparatus according to various exemplary embodiments of the present invention.

Referring to FIG. 3, a mobility sound generation apparatus 300 may include an information acquisition device 304 and a sound generation device 305.

Also, the mobility sound generation apparatus 300 may communicate with a server 301 and a mobility audio speaker 310 to transmit/receive information or commands.

The server 301 may include a server that overall manages a mobility, or a server that manages sound generation of the mobility.

Weather information may be provided to the mobility sound generation apparatus 300, and a background sound, an equalizer, and beat samples necessary for the sound generation device 305 to generate a sound may be provided.

The information acquisition device 304 may acquire information on a landscape while driving, based on information on navigation map 302 of the mobility and image information acquired through a camera 303 provided in the mobility.

For example, the information acquisition device 304 may determine whether there is a previous driving history in an area in which the mobility is driving, based on the information on the navigation map 302 of the mobility, and when there is a previous driving history, acquire information on the landscape acquired in a previous driving by loading the information stored.

For example, the information acquisition device 304 may identify an area in which the mobility is driving based on the information on the navigation map 302 of the mobility, and acquire information on environment such as mountains, water, and buildings forming the landscape of the area.

For example, the information acquisition device 304 may detect a portion corresponding to a first category item and a second category item in the real-time landscape based on the image information acquired through the camera 303 provided in the mobility while driving.

For example, the information acquisition device 304 may detect a portion corresponding to a first category item, such as mountains, water, buildings, or the like in the real-time landscape based on the image information acquired through the camera 303 provided in the mobility while driving.

For example, the information acquisition device 304 may detect a portion corresponding to a second category item, such as other vehicles, heterogeneous mobility, persons, or the like in the real-time landscape based on the image information acquired through the camera 303 provided in the mobility while driving.

For example, the information acquisition device 304 may use a deep learning-based object detection algorithm to detect portions corresponding to the first category items and the second category items in the real-time landscape while driving.

The sound generation device 305 may perform first category analysis 306, second category analysis 307, audio analysis 308, and sound sample reproduction variable setting 309.

For example, the sound generation device 305 may perform the first category analysis 306 by determining the proportion of objects corresponding to the first category items in the landscape while driving.

For example, the sound generation device 305 may generate a background sound by mixing background sounds corresponding to objects respectively corresponding to first category items in various forms according to the proportions of objects respectively corresponding to the first category items in the landscape while driving.

As an example, the sound generation device 305 may determine a speed of movement according to the types of objects corresponding to the second category items in the landscape while driving, determine a density of the objects, and perform the second category analysis 307.

For example, the sound generation device 305 may generate a faster beat as the speed of movement according to the type of objects corresponding to the second category item increases.

For example, the sound generation device 305 may generate a beat having a larger sound volume as the density of objects corresponding to the second category items increases.

For example, the sound generation device 305 may select an equalizer according to current weather, and when there is a previous driving record in a location in which the mobility is driving, perform the audio analysis 308 by reflecting a sound in the case of the previous driving.

For example, the sound generation device 305 may generate a sound by use of a background sound used in the case of previous driving as a background sound during current driving.

For example, the sound generation device 305 may perform the sound sample reproduction variable setting 309 based on results of the first category analysis 306, the second category analysis 307, and the audio analysis 308.

For example, the sound generation device 305 may set reproduction variables such as an equalizer, a sound volume, a sound speed for a sound sample received from the server 301 based on the results of the first category analysis 306, the second category analysis 307, and the audio analysis 308.

The sound generation device 305 may transmit information on the generated sound to the mobility audio speaker 310 to output the generated sound through the mobility audio speaker 310.

Figure 4:
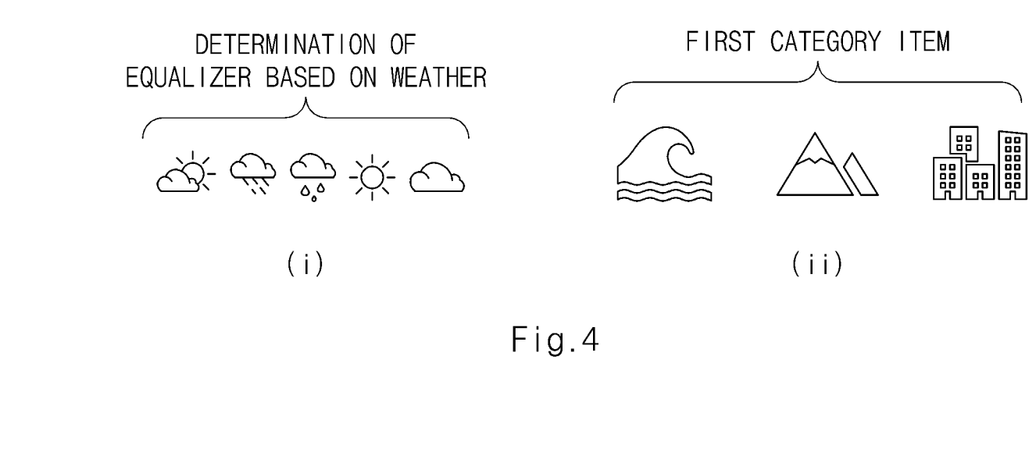
FIG. 4 is a diagram illustrating that a mobility sound generation apparatus according to various exemplary embodiments of the present invention generates a sound according to weather and first category items.

FIG. 4 is a diagram illustrating that a mobility sound generation apparatus according to various exemplary embodiments of the present invention generates a sound according to weather and first category items.

In FIG. 4, (i) shows items for classifying weather.

For example, the mobility sound generation apparatus 100 or 300 may select a weather classification item corresponding to current weather.

As an example, the weather classification item may include sunny, cloudy, rain, snow, slightly cloudy, thunder, lightning, and the like.

For example, the mobility sound generation apparatus 100 or 300 may generate an image according to the weather classification item corresponding to the current weather.

As an example, the mobility sound generation apparatus 100 or 300 may generate an image corresponding to the weather classification item.

For example, the image corresponding to the weather classification item may include a circle, a square, a rectangle, a water droplet shape, a rhombus, and the like.

For example, the image corresponding to the weather classification item may be stored in the mobility sound generation apparatus 100 or 300 in a form of a table, and the mobility sound generation apparatus 100 or 300 may select an image according to the weather classification item corresponding to the current weather through the table.

The mobility sound generation apparatus 100 or 300 may determine a sound volume ratio (equalizer) of frequency bands of a sound corresponding to an image.

The mobility sound generation apparatus 100 or 300 may perform an equalizer function of sound generation by determining a volume level ratio of frequency bands of 60 Hz, 230 Hz, 910 Hz, 3.6 kHz, and 14 kHz of the sound.

As an example, the mobility sound generation apparatus 100 or 300 may perform Fourier transform on features of a shape of an image to match a tone of music.

For example, the mobility sound generation apparatus 100 or 300 may match a center portion of an image obtained by performing image processing through a Fourier transform on the image corresponding to weather to a low frequency and match an edge of the image to a high frequency.

The mobility sound generation apparatus 100 or 300 may divide the image into five portions with respect to the center portion of the image obtained by performing image processing through Fourier transform on the image corresponding to the weather and determine the volume level ratio of the frequency bands of 60 Hz, 230 Hz, 910 Hz, 3.6 kHz, and 14 kHz of the sound according to the ratio by summing up the energy values respectively corresponding to the portions of the image.

Here, the frequency bands of 60 Hz, 230 Hz, 910 Hz, 3.6 kHz, and 14 kHz are arbitrarily determined frequencies for the sake of example, and may actually be determined to other frequency values.

In FIG. 4, (ii) shows first category items.

As an example, the preset first category item may include water, mountains, and buildings.

The mobility sound generation apparatus 100 or 300 may identify a first category item of a landscape while driving through a navigation device of the mobility or a camera provided in the mobility.

For example, the mobility sound generation apparatus 100 or 300 may detect a first category item based on an area within a radius of 1 km in the driving direction through a camera provided on the front portion of the mobility.

Here, the distance of 1 km is an arbitrarily determined distance for the sake of example, and may practically be set to a different value.

As an example, the mobility sound generation apparatus 100 or 300 may generate a background sound by mixing background sounds according to the ratio of the first category items detected in the landscape while driving, based on the background sound corresponding to the preset first category items.

Figure 5:
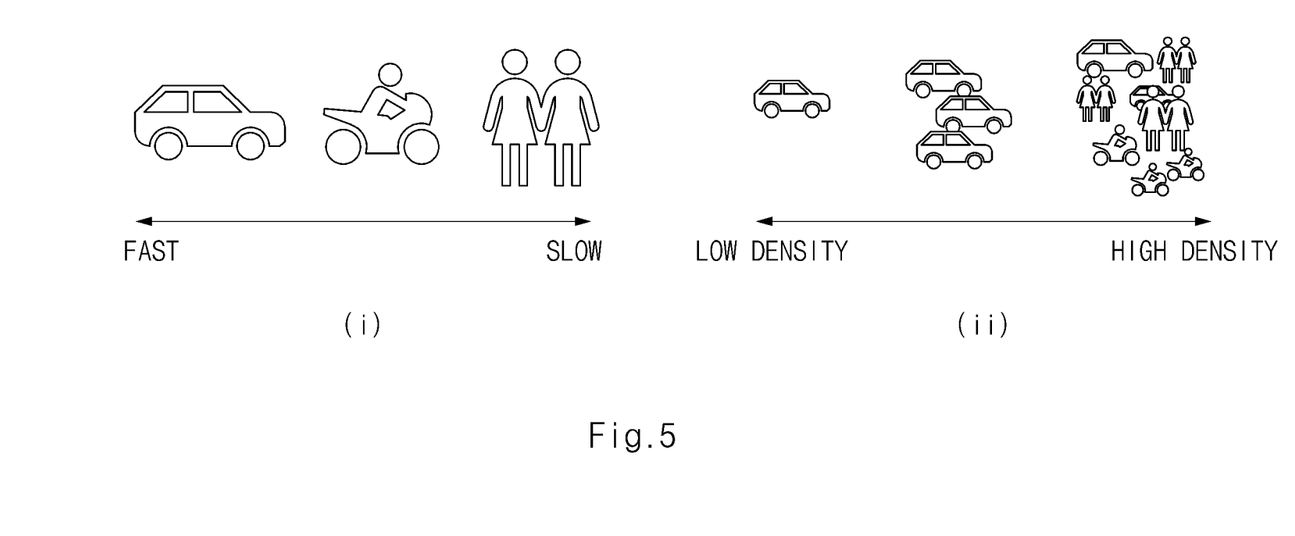
FIG. 5 is a diagram illustrating that a mobility sound generation apparatus according to various exemplary embodiments of the present invention generates a sound according to second category items.

FIG. 5 is a diagram illustrating that a mobility sound generation apparatus according to various exemplary embodiments of the present invention generates a sound according to second category items.

In FIG. 5, (i) shows vehicles, heterogeneous mobility, and persons corresponding to second category items in the order of movement speeds.

As an example, the mobility sound generation apparatus 100 or 300 may detect an object corresponding to a second category item from images acquired through cameras provided in the front portion and rear portion of the mobility.

The mobility sound generation apparatus 100 or 300 may store information on the movement speeds of the second category items in advance.

The mobility sound generation apparatus 100 and 300 may determine the movement speed of the type of an object corresponding to a second category item found in landscape while driving, and generate a faster beat as the movement speed of the type of the object corresponding to the classification item increases or a slower beat as the movement speed of the type of the object corresponding to the classification item decreases.

For example, the mobility sound generation apparatus 100 or 300 may set a basic speed beat according to the type of an object corresponding to a second category item found in a landscape while driving, and modify a beat speed in a response to the speed of an object corresponding to the second category item determined through an image obtained in real time.

In FIG. 5, (ii) shows vehicles, heterogeneous mobility, and persons corresponding to the second category items in the order of the density thereof.

As an example, the mobility sound generation apparatus 100 or 300 may determine the density of an object corresponding to a second category item from images acquired through cameras provided in the front portion and rear portion of the mobility.

As an example, the mobility sound generation apparatus 100 or 300 may determine the density around the mobility in consideration of the size and number of objects of a second category item detected in an image obtained through the camera.

The mobility sound generation apparatus 100 or 300 may generate a beat having a smaller sound volume as the density around the mobility is lower, and may generate a beat having a larger sound as the density around the mobility is higher.

Figure 6:
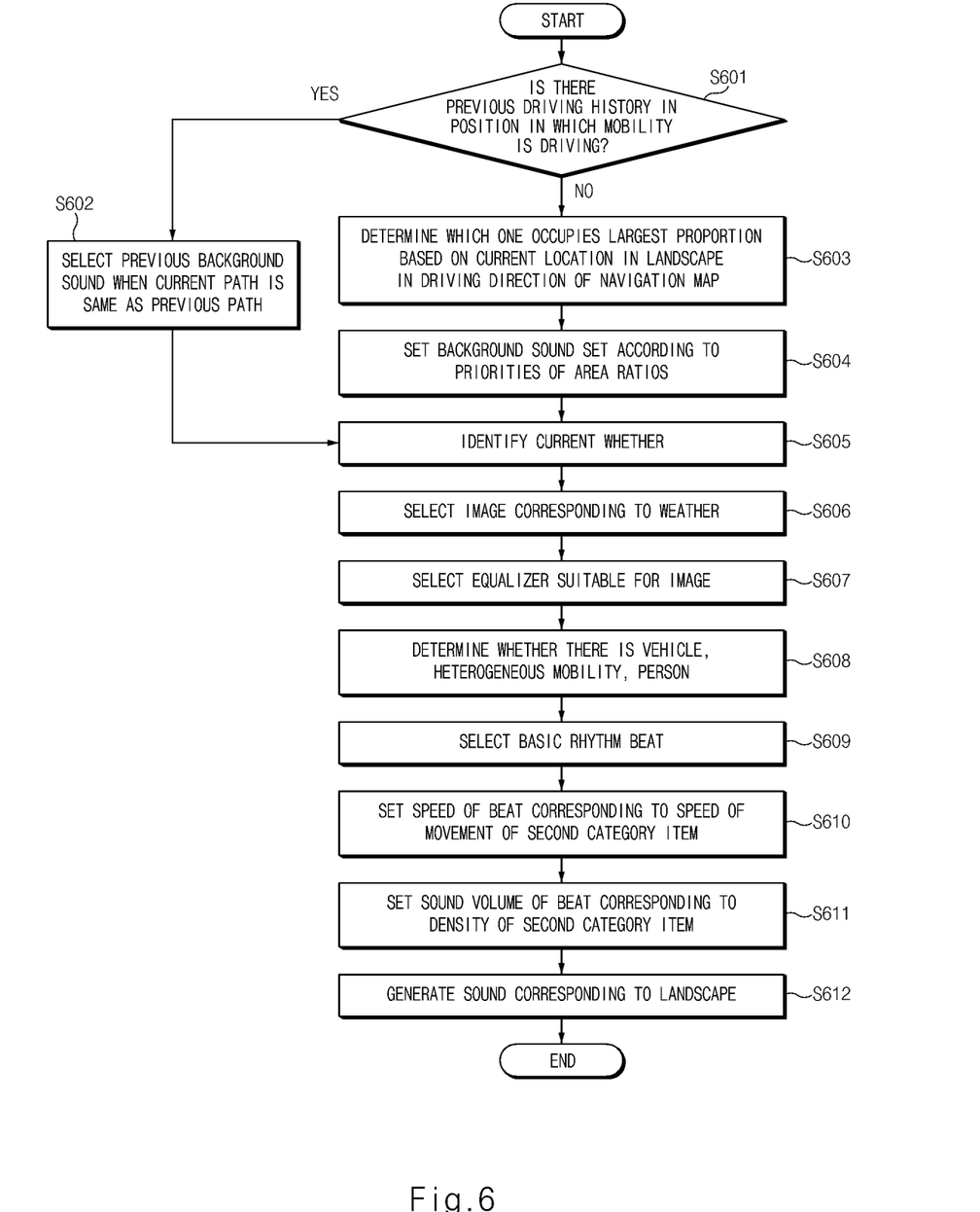
FIG. 6 is a flowchart illustrating an operation of a mobility sound generation apparatus according to various exemplary embodiments of the present invention.

FIG. 6 is a flowchart illustrating an operation of a mobility sound generation apparatus according to various exemplary embodiments of the present invention.

Referring to FIG. 6, the mobility sound generation apparatus 100 or 300 may determine whether there is a previous driving history in a location in which the mobility is driving (S601).

For example, the mobility sound generation apparatus 100 or 300 may determine whether there is a previous driving history in a location in which the mobility is driving, through a mobility navigation system.

After determining whether there is a previous driving history in a location in which the mobility is driving (S601), the mobility sound generation apparatus 100 or 300 may select a previous background sound as the background sound in a case where the mobility is driving in the same driving path when it is determined that there is a previous driving history in a location in which the mobility is driving (S602).

As an example, when it is determined that there is a previous driving history in the location in which the mobility is driving, the mobility sound generation apparatus 100 or 300 may determine that a driving landscape is similar to the previous driving landscape, and set the previous sound background sound as the background sound.

After determining whether there is a previous driving history in a location in which the mobility is driving (S601), the mobility sound generation apparatus 100 or 300 may determine which one occupies the largest proportion based on the current location in the landscape in the driving direction of the navigation map when it is determined that there is no previous driving history in a location in which the mobility is driving (S603).

As an example, the mobility sound generation apparatus 100 or 300 may acquire information on a ratio of first category items seen in the landscape in the driving direction through navigation map information.

The mobility sound generation apparatus 100 or 300 may determine which one occupies the largest proportion based on the current location in the landscape in the driving direction of the navigation map (S603), and then set a background sound set according to the priorities of the area ratios (S604).

Although not shown, as various exemplary embodiments of the present invention, the mobility sound generation apparatus 100 or 300 may set a background sound to a sound identical to or different from the background sound which has been selected previously in consideration of a previous background sound in similar conditions when items of different categories among landscape items have a similar ratio based on the current location.

For example, the mobility sound generation apparatus 100 or 300 may set, as a background sound, a sound corresponding to a first category item occupying the largest area, according to the priority of the area ratios of the first category items, and mix the background sounds according to the ratios.

The mobility sound generation apparatus 100 or 300 may select the previous sound background sound as the background sound (S602), and then identify the current weather (S605).

The mobility sound generation apparatus 100 or 300 may identify the current weather after setting the background sound set according to the area ratio priority (S604).

For example, the mobility sound generation apparatus 100 or 300 may identify the current weather in an area in which the mobility is driving through an AVN weather information system, identify the current weather by analyzing an image acquired through the camera, or identify the current weather by receiving information on the current weather through the server.

The mobility sound generation apparatus 100 or 300 may identify the current weather (S605) and select an image corresponding to the weather (S606).

For example, the mobility sound generation apparatus 100 or 300 may select a pre-stored image representing the current weather in correspondence with the current weather.

The mobility sound generation apparatus 100 or 300 may select an equalizer suitable for the image (S607) after selecting the image corresponding to the weather (S606).

For example, the mobility sound generation apparatus 100 or 300 may perform an equalizer function by setting a ratio of the volume levels of preset frequency bands according to a ratio obtained by summing up energy values for sectors of a new image obtained by performing Fourier transform on an image corresponding to the weather.

After selecting the equalizer suitable for an image (S607), the mobility sound generation apparatus 100 or 300 may determine whether a vehicle, a heterogeneous mobility, or a person exists in the vicinity of the mobility (S608).

As an example, the mobility sound generation apparatus 100 or 300 may perform image processing based on images acquired through cameras provided in front portion and rear portion of the mobility to determine whether other vehicles, heterogeneous mobility, or persons exist around the mobility.

The mobility sound generation apparatus 100 or 300 may select a basic rhythm beat (S609) after determining whether a vehicle, a heterogeneous mobility, or a person exists in the vicinity of the mobility (S608).

For example, the mobility sound generation apparatus 100 or 300 may select a corresponding basic rhythm beat according to which of another vehicle, a heterogeneous mobility, or a person is an object detected in the vicinity of the mobility.

After selecting the basic rhythm beat (S609), the mobility sound generation apparatus 100 or 300 may set a beat speed corresponding to the movement speed of the second category item (S610).

For example, the mobility sound generation apparatus 100 or 300 may determine a movement speed of the object detected in the vicinity of mobility in real time, and set a beat speed according to the movement speed of the object.

The mobility sound generation apparatus 100 or 300 may set a beat speed corresponding to the movement speed of the second category item (S610), and then set a sound volume of the beat corresponding to the density of the second category item (S611).

For example, the mobility sound generation apparatus 100 or 300 may determine the density of objects detected in the vicinity of the mobility in real time, and set the sound volume of the beat according to the density of the objects.

The mobility sound generation apparatus 100 or 300 may generate a sound corresponding to a landscape (S612) after setting the sound volume of the beat corresponding to the density of the second category item (S611).

The mobility sound generation apparatus 100 or 300 may generate a sound corresponding to the background sound, the equalizer, the beat speed, and the sound volume, which are set according to the landscape while driving.

Figure 7:
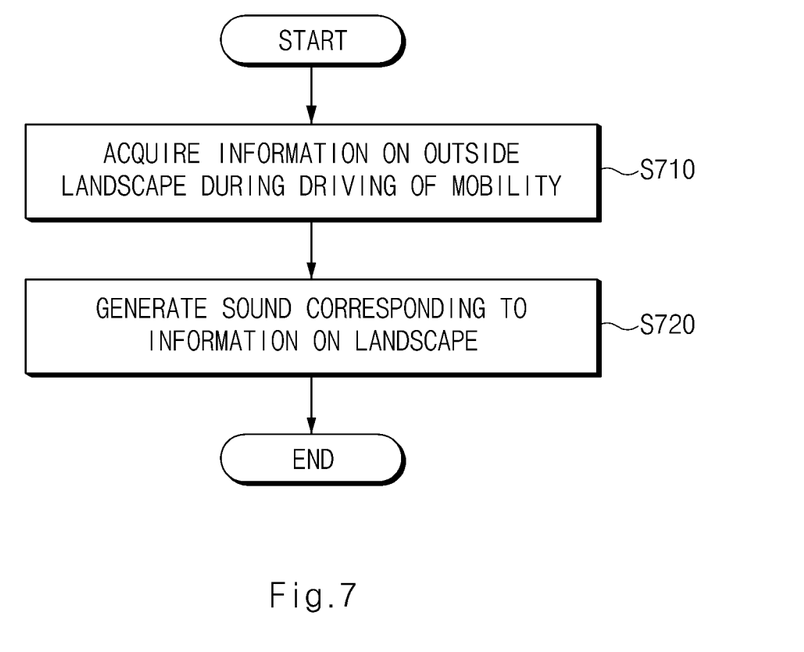
FIG. 7 is a flowchart of a mobility sound generation method according to various exemplary embodiments of the present invention.

FIG. 7 is a flowchart of a mobility sound generation method according to various exemplary embodiments of the present invention.

Referring to FIG. 7, the mobility sound generation method may include acquiring information on an outside landscape while driving of a mobility (S710) and generating a sound corresponding to the information on the landscape (S720).

In the mobility sound generation method, the acquiring of the information on the outside landscape while driving of the mobility (S710) may be performed by the information acquisition device 110.

As an example, the acquiring of the information on the outside landscape while driving of the mobility (S710) may include acquiring, by the information acquisition device 110, an external image through a camera provided in the mobility.

As various exemplary embodiments of the present invention, the acquiring of the information on the outside landscape while driving of the mobility (S710) may include, determining information on the outside landscape based on map information of externals at a current location when the information acquisition device 110 determines that navigation map information is accurate.

As an example, the acquiring of the information on the outside landscape while driving of the mobility (S710) may include determining information on external terrain based on the current location of the mobility at every specific period set according to a speed or at every specific driving distance of the mobility.

The generating of a sound corresponding to the information on the landscape (S720) may be performed by the sound generation device 120.

For example, the generating of the sound corresponding to the information on the landscape (S720) may include setting a background sound based on the ratio of a preset first category item occupying the landscape.

For example, the generating of the sound corresponding to the information on the landscape (S720) may include determining, by the sound generation device 120, a ratio of the sound volumes for frequency bands based on a weather.

For example, the determining, by the sound generation device 120, the ratio of the sound volumes for the frequency bands based on the weather may include generating, by the sound generation device 120, an image corresponding to the weather and determining, by the sound generation device 120, the ratio of the sound volumes for the frequency bands corresponding to the image.

As an example, the generating of the sound corresponding to the information on the landscape (S720) may include detecting, by the sound generation device 120, an image portion corresponding to a preset second category item in an external image and generating, by the sound generation device 120, a beat according to the detected preset second category item.

For example, the generating of the beat based on the detected preset second category item in the sound generation device 120 may include determining, by the sound generation device 120, a speed of the beat according to a type of the detected preset second category item.

As an example, the generating of the beat based on the detected preset second category item in the sound generation device 120 may include determining, by the sound generation device 120, a sound volume of the beat according to a density of the detected preset second category item.

For example, the generating of the sound corresponding to the information on the landscape (S720) may include setting, by the sound generation device 120, a background sound based on the background sound used in the previous driving, when it is determined based on navigation information of the mobility that a path through which the mobility is to drive includes a path through which the mobility has driven previously.

The operations of the method or the algorithm described in connection with the exemplary embodiments included herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present invention, and various modifications and variations may be made without departing from the essential characteristics of the present invention by those skilled in the art to which various exemplary embodiments of the present invention pertains.

Accordingly, the exemplary embodiment disclosed in various exemplary embodiments of the present invention is not intended to limit the technical idea of the present invention but to describe the present invention, and the scope of the technical idea of the present invention is not limited by the embodiment. The scope of protection of the present invention should be interpreted by the following claims, and all technical ideas within the scope equivalent thereto should be construed as being included in the scope of the present invention.

The effects of the mobility sound generation apparatus and the method thereof according to various exemplary embodiments of the present invention are provided as follows.

According to at least one of the exemplary embodiments of the present invention, it is possible to provide a mobility sound generation apparatus of generating a sound suitable for a landscape while driving and a method thereof.

According to at least one of the exemplary embodiments of the present invention, it is possible to provide a mobility sound generation apparatus of generating a sound expressing weather while driving of a mobility to enable an occupant of the mobility to recognize weather outside the mobility and a method thereof.

According to at least one of the exemplary embodiments of the present invention, it is possible to provide a mobility sound generation apparatus of generating and providing a sound corresponding to water, mountains, buildings, or the like forming a landscape outside the mobility, expressing the landscape with the sound while driving to generate a driving environment for facilitating an occupant to enjoy the landscape, and a method thereof.

According to at least one of the exemplary embodiments of the present invention, it is possible to provide a mobility sound generation apparatus of dynamically expressing an external environment with sound by providing different sound beats according to mobility, bike, person, or the like existing in the vicinity of the mobility while driving and a method thereof.

According to at least one of the exemplary embodiments of the present invention, it is possible to provide a mobility sound generation apparatus of generating tension while driving by expressing a degree of congestion around mobility with sound and a method thereof.

Furthermore, various effects may be provided that are directly or indirectly understood through the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobility sound generation apparatus comprising:
    an information acquisition device provided in a mobility to acquire information on an outside landscape of the mobility while driving of the mobility;
    a sound generation device configured to generate a sound corresponding to the information on the outside landscape; and
    a sound output device configured to output the generated sound,
    wherein the sound generation device is configured to:
        acquire information on a ratio of first category items seen in the outside landscape;
        determine which one occupies a largest ratio based on a current location in the outside landscape; and
        set a background sound based on a ratio of a landscape corresponding to a preset first category item in the outside landscape, and
    wherein the background sound is set according to priorities of area ratios,
        wherein the information acquisition device is configured to:
            acquire an external image through at least a camera provided in the mobility, and
        wherein the sound generation device is configured to:
            detect an image information corresponding to a preset second category item in the external image, and
            generate a faster beat as a movement speed of a type of an object corresponding to the second category item increases or a slower beat as the movement speed of the type of the object corresponding to the second category item decreases.

2. The mobility sound generation apparatus of claim 1, wherein the information acquisition device is configured to acquire the information on the outside landscape through a navigation map of the mobility and the at least a camera provided in the mobility.

3. The mobility sound generation apparatus of claim 1, wherein the preset first category item includes at least one of mobility, buildings, water, persons and mountains.

4. The mobility sound generation apparatus of claim 1, wherein the sound generation device is configured to determine a ratio of sound volumes for frequency bands based on a weather.

5. The mobility sound generation apparatus of claim 4, wherein the sound generation device is configured to:
    generate an image corresponding to the weather, and
    determine the ratio of sound volumes for frequency bands corresponding to the image.

6. The mobility sound generation apparatus of claim 1, wherein the sound generation device is configured to determine a speed of the beat according to a type of the detected preset second category item.

7. The mobility sound generation apparatus of claim 1, wherein the sound generation device is configured to determine a sound volume of the beat according to a density of the detected preset second category item.

8. The mobility sound generation apparatus of claim 1, wherein the preset second category item includes at least a vehicle, a heterogeneous mobility, and a person.

9. The mobility sound generation apparatus of claim 1, wherein the sound generation device is configured to set the background sound based on a background sound used in a previous driving when the sound generation device determines, based on navigation information of the mobility, that a path through which the mobility is to drive includes a path through which the mobility has driven previously.

10. A mobility sound generation method comprising:
acquiring, by an information acquisition device provided in a mobility, information on an outside landscape of the mobility while driving of the mobility; and
generating, by the sound generation device, a sound corresponding to the information on the outside landscape,
wherein the sound generation device is configured to:
  acquire information on a ratio of first category items seen in the outside landscape;
  determine which one occupies a largest ratio based on a current location in the outside landscape; and
  set a background sound based on a ratio of a landscape corresponding to a preset first category item in the outside landscape, and
wherein the background sound is set according to priorities of area ratios,
wherein the generating, by the sound generation device, of the sound corresponding to the information on the outside landscape includes:
  detecting, by the sound generation device, an image information corresponding to a preset second category item in an external image; and
  generating, by the sound generation device, a faster beat as a movement speed of a type of an object corresponding to the second category item increases or a slower beat as the movement speed of the type of the object corresponding to the second category item decreases.

11. The mobility sound generation method of claim 10, wherein the generating, by the sound generation device, of the sound corresponding to the information on the outside landscape includes determining, by the sound generation device, a ratio of sound volumes for frequency bands based on a weather.

12. The mobility sound generation method of claim 11, wherein the determining, by the sound generation device, of the ratio of sound volumes for frequency bands based on the weather includes:
  generating, by the sound generation device, an image corresponding to the weather; and
  determining, by the sound generation device, the ratio of sound volumes for frequency bands corresponding to the image.

13. The mobility sound generation method of claim 10, wherein the acquiring, by the information acquisition device, of the information on the outside landscape during the driving of the mobility includes acquiring, by the information acquisition device, the external image through a camera provided in the mobility.

14. The mobility sound generation method of claim 10, wherein the generating of the beat based on the detected preset second category item includes at least one of:
  generating, by the sound generation device, a speed of the beat according to a type of the detected preset second category item; and
  determining, by the sound generation device, a sound volume of the beat according to a density of the detected preset second category item.

15. The mobility sound generation method of claim 10, wherein the generating, by the sound generation device, of the sound corresponding to the information on the outside landscape includes setting, by the sound generation device, the background sound based on a background sound used in a previous driving when the sound generation device determines based on navigation information of the mobility that a path through which the mobility is to drive includes a path through which the mobility has driven previously.

* * * * *